United States Patent Office 3,006,362
Patented Oct. 31, 1961

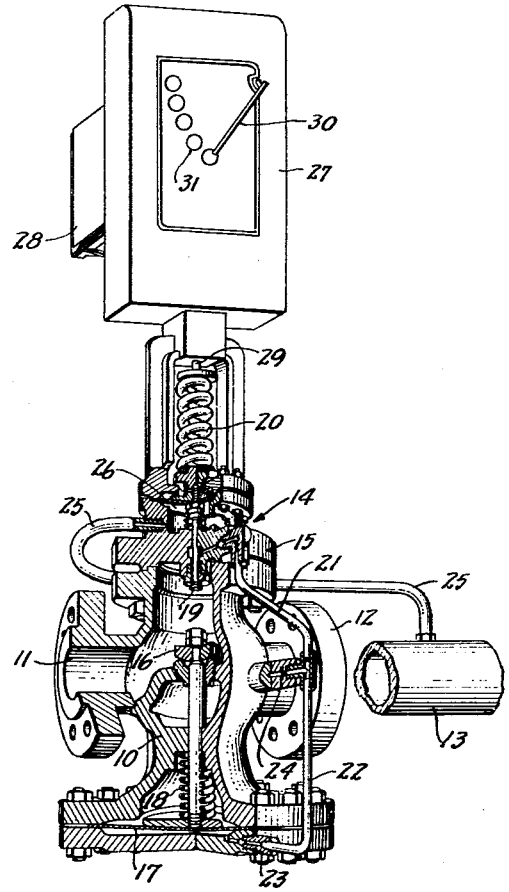
FIG. I.

3,006,362
REGULATING-VALVE MEANS
Paulsen Spence, Baton Rouge, La.
Original application Mar. 7, 1952, Ser. No. 275,275, now Patent No. 2,787,285, dated Apr. 2, 1957. Divided and this application Feb. 26, 1957, Ser. No. 652,328
1 Claim. (Cl. 137—489.5)

My invention relates to pressure-regulating systems and, in particular, to those which must supply relatively large quantities of pressure fluid to a remote load. The present restricted application is based on my original application, Serial No. 275,275, filed March 7, 1952, now Patent No. 2,787,285.

In heating systems for large buildings or for other substantial steam loads, difficulty is often encountered in bringing the system from zero to full load. In an apartment or office building, for example, the heating plant may be shut down during the night hours; but, when the steam is first supplied to the system in the morning, the main regulating valve and all auxiliary regulating valves will demand the utmost flow of steam until the entire system has been supplied. This demand may occasion undesirable transients before the regulating system reaches equilibrium or some satisfactory operating point. These transients may be the cause of banging or other noise throughout the supply system, and undue mechanical wear and damage may also result.

It is, accordingly, an object of the invention to provide an improved pressure-regulating system of the character indicated.

It is another object to provide an improved pressure-regulating system wherein steam may be safely supplied to a large load without encountering undue transients.

It is also an object to provide an improved pressure-regulating system in which the normal regulating point may be advanced in stepped increments, so as to permit the subsidence of relatively small transients for each increment before advancing to the next increment of regulated pressure.

It is a further object to provide an improved pressure-regulating system wherein the regulating point is automatically controlled in accordance with a given change in a detected physical quantity, as sensed at the load supplied by the said regulating means.

It is a specific object to provide a pressure-regulating means meeting the above objects and incorporating a timing mechanism assuring the lapse of a pre-selected time between incremental changes in the regulating point of the system.

Another specific object is to provide an improved pressure-regulating system wherein the rate of flow of pressure fluid governed by the regulating means may determine the regulating point thereof.

Other objects and various further features of the invention will be pointed out or will occur to those skilled in the art from a reading of the following specification, in conjunction with the accompanying drawings, which show, for illustrative purposes only, preferred forms of the invention:

FIG. 1 is a perspective view important elements of a regulating system incorporating features of the invention, a portion of the main-valve body being cut away and shown in section;

Briefly stated, my invention contemplates an improved pressure-regulating system including a main valve and regulating means for said main valve. The regulating means may include pressure-operated pilot-valve means, and I provide automatic preloading means for biasing the operating point of the regulating means in a sequence of biasing increments. The pressure-responsive actuating means for the pilot valve may include a control-pressure connection downstream from the main valve. In one general form of the invention, the automatic preloading means includes means for stepping the bias on the pilot valve in given biasing increments at predetermined timing intervals. The timing means may be a motor; alternatively, it may be a float rising in a reservoir that is being filled at a predetermined rate. In another general form of the invention, a given physical quantity characteristic of the fluid at the load must attain some magnitude before an incremental bias is applied to the pilot valve. If desired, a flow-rate governor may be incorporated in the system to assure that the regulating system will not supply pressure fluid at more than a given rate of flow.

Referring to FIG. 1 of the drawings, my invention is shown in application to a main valve having a body 10 with an inlet connection 11 and an outlet connection 12. The outlet may be connected to a conduit 13 for supplying pressure fluid downstream, as to a remote load (not shown). The main-valve structure shown incorporates pressure-operated pilot means 14 integral with the bonnet 15 thereof. Such structure is shown and described in greater detail in my copending patent application, Serial No. 759,809, filed July 9, 1947, now Patent No. 2,639,556, reference to which may be had for a more complete structural description.

The main valve 10 includes a disc 16 for passing pressure-fluid from the inlet 11 downstream to be conduit 13. Pressure-responsive actuating means for the disc 16 may include a flexible diaphragm 17. Spring means 18 normally urge the valve disc 16 to closed position.

The pilot valve 14 may include a pilot-valve disc 19, normally urged by compression spring 20 to an open position, so as to pass high-pressure fluid (from upstream of the main-valve disc 16) past the pilot member 19 and via pipe connections 21—22 to the active face of diaphragm 17. The connection 23 between pipe 22 and the space over diaphragm 17 may include a bleed, and bleed means 24 are also preferably provided between one of the connections 21—22 and the downstream or outlet side of the main valve. Control of the regulating point for the described elements may be effected by pressure developed in line 25, working over pilot diaphragm 26 and in opposition to the biasing force of spring 20.

In accordance with a feature of the invention, the control pressure supplied in line 25 is derived from a point downstream from the main valve, as by the connection shown to the conduit 13; at the same time, means are provided for changing the bias of spring 20 in automatically controlled increments. In the form shown in FIG. 1, I employ a so-called motor positioner 27 for variously preloading or biasing the spring 20; it suffices to say that the device 27 includes motor or timing means 28 for determining intervals at which the actuating stem 29 will be driven downwardly and in incrementally greater biasing relation with the spring 20. The motor positioner shown has five positions and, therefore, adjusts the load on the biasing means 20 in corresponding incremental steps, as indicated by an external arm 30, which may swing with each step to indicate the point at which the system is operating at any given time.

In operation, a heating system equipped with the described device will, when cold, have the relation of parts shown. When steam under high pressure is first delivered to the main valve at inlet 11, the motor 28 must be started. High-pressure steam will be admitted past pilot-valve member 19 and delivered to the diaphragm 17, so as to open the main-valve member 16. The initial setting of the motor positioner 27 will produce a relatively light biasing load at 29 on the spring 20, so that the valve will be regulated about a relatively low-pressure point, by means of the downstream control-pressure pickup at 25.

After the lapse of a given interval of time, as determined by a motor (28) setting appropriate to the system being supplied by the regulating means of FIG. 1, the positioner 27 will be automatically operated to project its actuating stem 29 downwardly by a relatively small increment, thereby increasing the load on spring 20 and determining a correspondingly higher regulating pressure. With this projection of stem 29, the indicator 30 may be advanced to the second step, opposite the mark 31.

After a further lapse of time, as determined by an appropriate setting of the motor 28, the stem 29 will be automatically further depressed so as again to raise the regulating point of the system by a predetermined incremental amount. The process will be automatically repeated for each motor-controlled advance of the positioner 27 until such time as the full-load operating point is reached. For most satisfactory operation, it will be understood that the number of incremental advances provided by the positioner 27 should be adequate for the load system to be supplied by the regulating means; in other words, each increase in regulated pressure (for each biasing increment determined by the positioner 27) is preferably an increment that can be smoothly handled by the system.

While I have described my invention in detail for the preferred forms shown, it will be understood that modifications may be made within the scope of the invention as defined by the following claim.

I claim:

In a pressure-regulating system of the character indicated, a main valve including a body having an inlet port and an outlet port and a main-valve member therebetween, said valve also having a bonnet opening overstanding said main-valve member on the inlet side thereof, pressure-responsive actuating means for said main-valve member, an integral pressure-responsive pilot valve secured at said bonnet opening and having a pilot-valve member exposed within the inlet side of said main valve, pressure-responsive actuating means for said pilot-valve member and including a control-pressure connection downstream from said main valve, a connection from the downstream side of said pilot-valve member to said pressure-responsive actuating means for said main-valve member, said last-mentioned connection including a bleed connection to the downstream side of said main valve, said pressure pilot including resilient means biasing the control pressure characteristic thereof, a motor carried by said pilot valve for preloading said resilient means, and means including said motor for automatically increasing the preload on said resilient means in predetermined steps and at predetermined time intervals

References Cited in the file of this patent

UNITED STATES PATENTS

| | | |
|---|---|---|
| 1,701,865 | Soderberg | Feb. 12, 1929 |
| 2,583,006 | Niesemann | Jan. 22, 1952 |
| 2,639,556 | Spence | May 26, 1953 |